US012772182B2

(12) United States Patent
Guo et al.

(10) Patent No.: US 12,772,182 B2
(45) Date of Patent: Oct. 20, 2026

(54) SCHEMES FOR ADJUSTING UPLINK TRANSMISSION TIMING

(71) Applicant: ZTE Corporation, Shenzhen (CN)

(72) Inventors: Xiaolong Guo, Shenzhen (CN); Bo Gao, Shenzhen (CN); Yang Zhang, Shenzhen (CN); Ke Yao, Shenzhen (CN); Shujuan Zhang, Shenzhen (CN); Ling Yang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 298 days.

(21) Appl. No.: 18/601,715

(22) Filed: Mar. 11, 2024

(65) Prior Publication Data

US 2024/0251362 A1 Jul. 25, 2024

Related U.S. Application Data

(63) Continuation of application No. PCT/CN2022/108686, filed on Jul. 28, 2022.

(51) Int. Cl.
*H04W 56/00* (2009.01)

(52) U.S. Cl.
CPC ... *H04W 56/0005* (2013.01); *H04W 56/0045* (2013.01)

(58) Field of Classification Search
CPC ...................... H04W 56/0005; H04W 56/0045
See application file for complete search history.

(56) References Cited

U.S. PATENT DOCUMENTS

2014/0050213 A1 2/2014 Nguyen et al.
2021/0289495 A1 9/2021 Korhonen et al.
2022/0014328 A1 1/2022 Sakhnini et al.
2022/0124795 A1* 4/2022 Wu .................... H04B 7/18563
2022/0210825 A1 6/2022 Zhu et al.
(Continued)

FOREIGN PATENT DOCUMENTS

CN 113508624 10/2021

OTHER PUBLICATIONS

Extended European Search Report for co-pending EP Application 22952402.0, Report dated Oct. 28, 2024, 8 pages.
(Continued)

*Primary Examiner* — Zhiren Qin
(74) *Attorney, Agent, or Firm* — Ashurst Perkins Coie US LLP

(57) ABSTRACT

A method of wireless communication is described. The method includes receiving, by a user device from a base station, timing advance information including a first timing advance information and a second timing advance information; receiving, transmission resource information associated with transmission information; determining a first transmission timing for a first transmission associated with a first transmission resource information based on the first timing advance information and a second transmission timing for a second transmission associated with a second transmission resource information based on the second timing advance information; and transmitting, based on the determining, the first transmission in a first time period using a first transmission timing and a second transmission in a second time period using a second transmission timing.

20 Claims, 11 Drawing Sheets

(56) References Cited

U.S. PATENT DOCUMENTS

| | | | | |
|---|---|---|---|---|
| 2022/0304036 | A1* | 9/2022 | Zhang | H04B 7/022 |
| 2022/0385347 | A1* | 12/2022 | Yang | H04W 24/10 |
| 2023/0007608 | A1* | 1/2023 | Li | H04W 56/0045 |
| 2023/0254832 | A1* | 8/2023 | Sen | H04L 5/0094 370/329 |
| 2024/0031964 | A1* | 1/2024 | Wu | H04B 7/18513 |
| 2024/0323880 | A1* | 9/2024 | Zhu | H04B 7/18513 |
| 2025/0048291 | A1* | 2/2025 | Shin | H04W 56/0045 |
| 2025/0274240 | A1* | 8/2025 | Zhang | H04W 56/0015 |
| 2026/0052495 | A1* | 2/2026 | Guo | H04W 56/0045 |

OTHER PUBLICATIONS

International Search Report and Written Opinion for PCT/CN2022/108686, filed Jul. 28, 2022, Report dated Dec. 21, 2022, 9 pages.

Qualcomm Incorporated "Simulation results for channel measurement restriction" 3GPP TSG-RAN WG4 #79 R4-163530, Nanjing, China, May 23-27, 2016, 4 pages.

Apple, Inc. "On Two Timing Advances for Multi-DCI Uplink Transmissions" 3GPP TSG RAN WG1 #109-e R1-2204230, e-Meeting, May 9-20, 2022, 4 pages.

ZTE "Ta enhancement for multi-DCI" 3GPP TSG RAN WG1 Meeting #109-e R1-2203264, e-Meeting, May 9-20, 2022 9 pages.

Interdigital, Inc. "Discussion on Multiple TA for multi-TRP" 3GPP TSG RAN WG1 #109-e R1-2203379, e-Meeting, May 9-20, 2022, 4 pages.

FUTUREWEI "Enhancements to support two TAs for multi-DCI" 3GPP TSG RAN WG1 Meeting #109-e R1-2203062, e-Meeting, May 9-May 20, 2022, 10 pages.

Nokia, et al. "Two TAs for UL multi-DCI multi-TRP operation" 3GPP TSG RAN WG1 #109-e Meeting R1-2204539, e-Meeting, May 9-May 20, 2022, 7 pages.

* cited by examiner

SCHEMES FOR ADJUSTING UPLINK TRANSMISSION TIMING

CROSS-REFERENCE TO RELATED APPLICATION

This application is a continuation and claims priority to International Application No. PCT/CN2022/108686, filed on Jul. 28, 2022, the disclosure of which is hereby incorporated by reference herein in its entirety.

TECHNICAL FIELD

This patent document generally relates to systems, devices, and techniques for wireless communications.

BACKGROUND

Wireless communication technologies are moving the world toward an increasingly connected and networked society. The rapid growth of wireless communications and advances in technology has led to greater demand for capacity and connectivity. Other aspects, such as energy consumption, device cost, spectral efficiency, and latency are also important to meeting the needs of various communication scenarios. In comparison with the existing wireless networks, next generation systems and wireless communication techniques need to provide support for an increased number of users and devices.

SUMMARY

This document relates to methods, systems, and devices for adjusting uplink transmission timing.

In one aspect, a wireless communication method is disclosed. The method includes receiving, by a user device from a base station, timing advance information including a first timing advance information and a second timing advance information; receiving, transmission resource information associated with transmission information; determining a first transmission timing for a first transmission associated with a first transmission resource information based on the first timing advance information and a second transmission timing for a second transmission associated with a second transmission resource information based on the second timing advance information; and transmitting, based on the determining, the first transmission in a first time period using a first transmission timing and a second transmission in a second time period using a second transmission timing.

In another aspect, a wireless communication method is disclosed. The method includes transmitting, by a base station to a user device, timing advance information including a first timing advance information and a second timing advance information; transmitting transmission resource information associated with transmission information; and receiving, from the user device, a first transmission associated with a first transmission resource information at a first transmission timing and a second transmission associated with a second transmission resource information at a second transmission timing, the first transmission and the second transmission occurring in a first time period and a second time period, respectively.

In another aspect, a communication apparatus comprising a processor configured to implement the above-described method is disclosed.

In another aspect, a computer readable medium having code stored thereon, the code, when executed, causing a processor to implement the above-described method is disclosed.

These, and other features, are described in the present document.

DETAILED DESCRIPTION

The disclosed technology provides implementations and examples of adjusting uplink transmission timing.

Downlink and uplink synchronization are necessary steps for ensuring reliable wireless communication in LTE and NR wireless system. The downlink synchronization is realized by receiving primary synchronization signal (PSS) and secondary synchronization signal (SSS), and the uplink synchronization is realized by random access procedure and uplink timing alignment maintenance.

Figure 1:
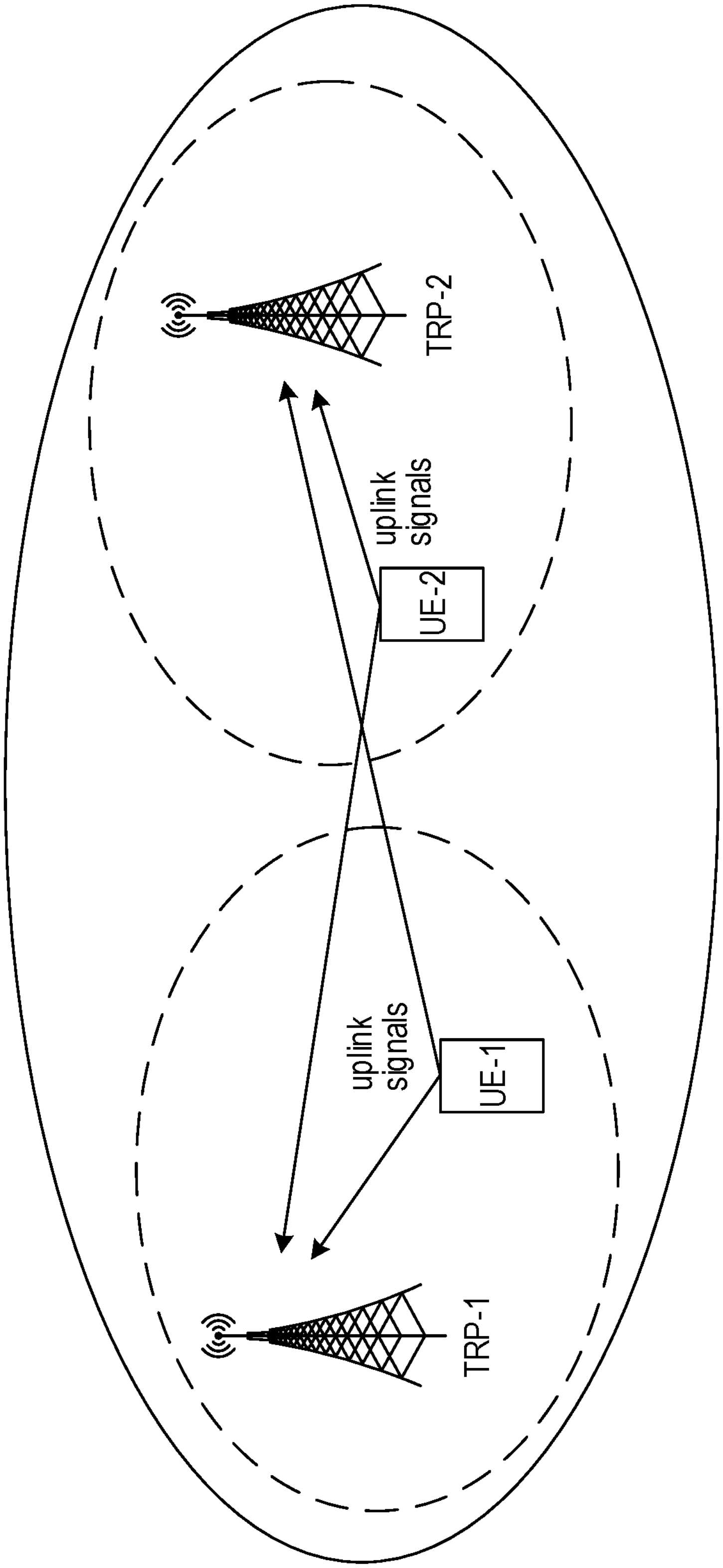
FIG. 1 illustrates an example diagram of inter-cell based MTRP (multiple Transmit-Receive Point) uplink transmissions from multiple UEs (user equipment).

FIG. 1 shows an example diagram of inter-cell based MTRP uplink transmissions from multiple UEs. As shown in FIG. 1, different geographical locations of base stations or different physical directions of panels might result in different transmission delay for all uplink and downlink signals. Uplink synchronization is to ensure arrival time of uplink signals from diverse UEs can be in the range of cyclic preamble of the downlink sub-frame/slot/sub-slot, which can be seen that uplink signals from the UEs are approximately aligned with each other.

The value of uplink transmission timing advance is related with $N_{TA,offset}$ determined by RRC signaling and Timing Advance Command (TAC) included in MAC CE. Normally, a network configures multiple Time Alignment Groups (TAG) to indicate timing advance for multiple serving cells and each TAG includes one or more serving cells. The base station transmits a TAC associated with a TAG, and the UE applies the TAC to determine timing advance for all serving cells in the TAG. For $N_{TA,offset}$, the UE expects that the same value is configured for serving cells in the same TAG.

For MTRP, the UE can transmit uplink transmissions to TRPs in a same serving cell and obtain the association between a TRP and an uplink signal based on CORESETPoolIndex, PCI or other information. For Configured Grant based PUSCH transmission or Sounding Reference Signal transmission, the UE transmits the corresponding signal based on the configured transmission information, e.g. time/frequency domain position and period, which means that the uplink transmission is not associated with a DCI or a CORESETPoolIndex. The association between a transmission of SRS/CG-PUSCH and a TRP can be obtained by RRC messages.

Mobility management is to support selection or re-selection of serving cell for UE without RRC_CONNECTED state and handover for UE with RRC_CONNECTED state. For handover, in order to reduce latency, UE can simultaneously maintain uplink synchronization for the source cell and the target cell in RRC_CONNECETD state, rather than operating the switching from RRC_CONNECETD state to RRC_INACTIVE/RRC_IDLE state to RRC_CONNECETD state. Separate uplink transmission timing advance timeline are maintained for the source cell and the target cell.

Figure 2:
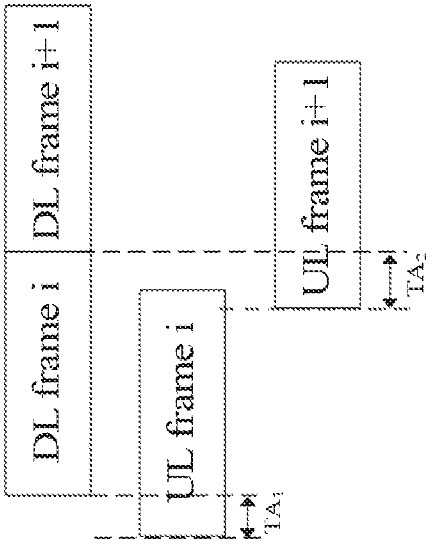
FIG. 2 illustrates examples different timing advances are applied to two adjacent slots.

Once receiving a TAC, the UE updates the timing advance and determines start time to apply the updated TA. FIG. 2 illustrates examples different timing advances are applied to two adjacent slots. In FIG. 2, two adjacent slots might be overlapped due to TAC updating, the former slot is applied the old TA ($TA_1$) and the latter slot is applied the updated TA ($TA_2$). The details on the TAC updating can be found in the related specification, e.g., NR TS 38.213. According to the description in NR TS 38.213, although not shown in FIG. 2, the UE will reduce the transmission duration of the latter slot, UL frame i+1, to handle the overlapping issue.

Multiple Transmit-Receive Points (MTRP) transmission technology has been developed with great progress, and multiple TRPs can be realized by multiple base stations or multiple panels of one base station. A user equipment (UE) can obtain the association between an uplink transmission and a TRP based on the index of SRS resource or the value of CORESETPoolIndex. For uplink transmissions transmitted semi-persistently or statically, the value of CORESETPoolIndex cannot be obtained due to lacking of DCI transmission, and SRS resources might be common for different TRPs, when separate uplink timing advance timeline is applied for different TRPs, some new schemes need to be introduced.

In legacy specifications for NR systems, two adjacent slots might be overlapped due to timing advance updating, and the UE requires to reduce transmission duration of the latter slot. When timing advance timeline is associated with TRP, two adjacent slots might also be overlapped due to different timing advances. The overlapping length in case of TA updating can be multiples of length of cyclic prefix and less than length of OFDM symbol, but the overlapping length in case of different TAs can be multiples of length of OFDM symbol, which means reducing the transmission duration of a slot can have great impacts on signals in the slot, hence some flexible rules need to be specified to address overlapping issue.

Generally, when either the transmission duration of the former or the latter slot is reduced, some uplink transmissions will be canceled or re-transmitted, and the UE requires to transmit the canceled transmissions once receiving a scheduling signalling or based on a default rule. Considering re-transmission procedures for canceled uplink transmissions can be complicated, a method of scheduling/transmission restriction is considered to avoid uplink transmission overlapping in adjacent slots.

(1) For adjusting transmission timing of an uplink transmission, the following is considered.
  - The UE is configured with multiple groups or sets of uplink signal resources, each of the group or set is associated with a transmission information. Each transmission information is associated with a timing advance information.
  - The UE adjusts the transmission timing of an uplink transmission based on the timing advance information associated with the resource set or group.

(2) Regarding reducing transmission duration of one of the adjacent overlapped slots, the following is considered.
  - The UE reduces transmission duration of a slot based on an indication from a message from the base station.
  - The UE reduces transmission duration of a slot based on an information of the transmissions transmitted in the slots, e.g. priority indication, UCI type, signal type, etc.

(3) To avoid overlapping between uplink transmission in adjacent slots, the following is considered.
  - A time gap is introduced not to transmit uplink transmissions to be overlapped.
  - The time gap is determined based on a predetermined table or value set.
  - The UE can receive a message indicating the value of the time gap.
  - The UE can report an expected value of time gap based on timing advance information difference within a period.

Various implementations of the disclosed technology provide various approaches for adjusting uplink transmission timing. Some implementations of the disclosed technology suggest techniques to adjust transmission timing of uplink transmissions when multiple timing advance timeline are applied. Some implementations of the disclosed technology obtain an association between uplink transmissions and timing advance information. Some implementations of the disclosed technology suggest reducing transmission duration of a slot in case that the uplink slot overlaps with another uplink slot. Some implementations of the disclosed technology suggest determining a time gap for the uplink transmissions to avoid overlapping of the uplink transmissions in adjacent slots.

Note that, in this patent document, 'transmission information' comprises at least one of transmit-receive point (TRP), base station or a set of panels of one base station. In some implementations, the TRP comprises at least one of "information grouping one or more reference signals", "PUCCH resource set", "reference signal resource set", "panel related information", "sub-array", "antenna group", "antenna port group", "group of antenna ports", "beam group", "physical cell index(PCI)", "TRP related information", "CORESET pool index", candidate cell, candidate cell group, time alignment group (TAG), a set of power control parameter, index of TCI state in a TCI state codepoint, "UE capability value" or "UE capability set".

Note that, in this document, TCI state codepoint is equivalent to TCI state entry or activation of TCI state MAC CE.

Note that, in this patent document, "beam state" is equivalent to quasi-co-location (QCL) state, transmission configuration indicator (TCI) state, spatial relation (also called as spatial relation information), reference signal (RS), spatial filter or pre-coding. For example, the spatial filter can be either at the UE-side or gNB-side, and the spatial filter may also be called as spatial-domain filter. Notes that, in this patent document, "spatial relation information" may comprise one or more reference RSs, which are used to represent the same or quasi-co "spatial relation" between targeted "RS or channel" and the one or more reference RSs. Notes that, in this patent, "beam state" is associated with or comprised of, one or more reference RSs and/or their corresponding QCL type parameters, where QCL type parameters include at least one of the following aspect or combination: [1] Doppler spread, [2] Doppler shift, [3] delay spread, [4] average delay, [5] average gain, and [6] Spatial parameter.

In this patent document, "TCI state" may be equivalent to "beam state." In this patent document, "spatial parameter" may be equivalent to spatial parameter, spatial Rx parameter or spatial filter. In this patent, there are the following definitions for 'QCL-TypeA', 'QCL-TypeB', 'QCL-TypeC', and 'QCL-TypeD'.

'QCL-TypeA': {Doppler shift, Doppler spread, average delay, delay spread}

'QCL-TypeB': {Doppler shift, Doppler spread}

'QCL-TypeC': {Doppler shift, average delay}

'QCL-TypeD': {Spatial Rx parameter}

Note that, in this patent document, "beam group" comprises at least one beam, beam state or TCI state.

Note that, in this patent document, "TRP-Id" comprises at least one of CORESET index, CORESET pool index, SS/PBCH index, transmission configuration indicator (TCI) state index, PCI, RS set index, SRS resource set index, spatial relation index, power control parameter set index, panel index, beam group index, sub-array index, the index of CDM group of DMRS ports, the group index of CSI-RS resources, CMR set index, candidate cell index, or candidate cell lists.

Note that, in this patent document, "uplink signal" can be PUCCH, PUSCH, SRS or PRACH.

Note that, in this patent document, "uplink transmission" comprises at least one of a transmission occasion of an uplink signal, a repetition of an uplink signal or an uplink signal.

Note that, in this patent document, "slot" can be equivalent to sub-slot, frame, sub-frame.

Note that, in this patent document, "uplink Control Information (UCI)" comprises HARQ-ACK information, SR, LRR and CSI.

Note that, in this patent document, Time Alignment Group (TAG) includes one or more serving cells or one or more serving cells associated with at least one transmission information.

Note that, in this patent document, timing advance information difference is determined based on timing advance information associated with adjacent slots/sub-slots/frames/sub-frames. It is valid only when the adjacent slots/sub-slots/frames/sub-frames are overlapped due to applying different timing advance information.

Figure 3:
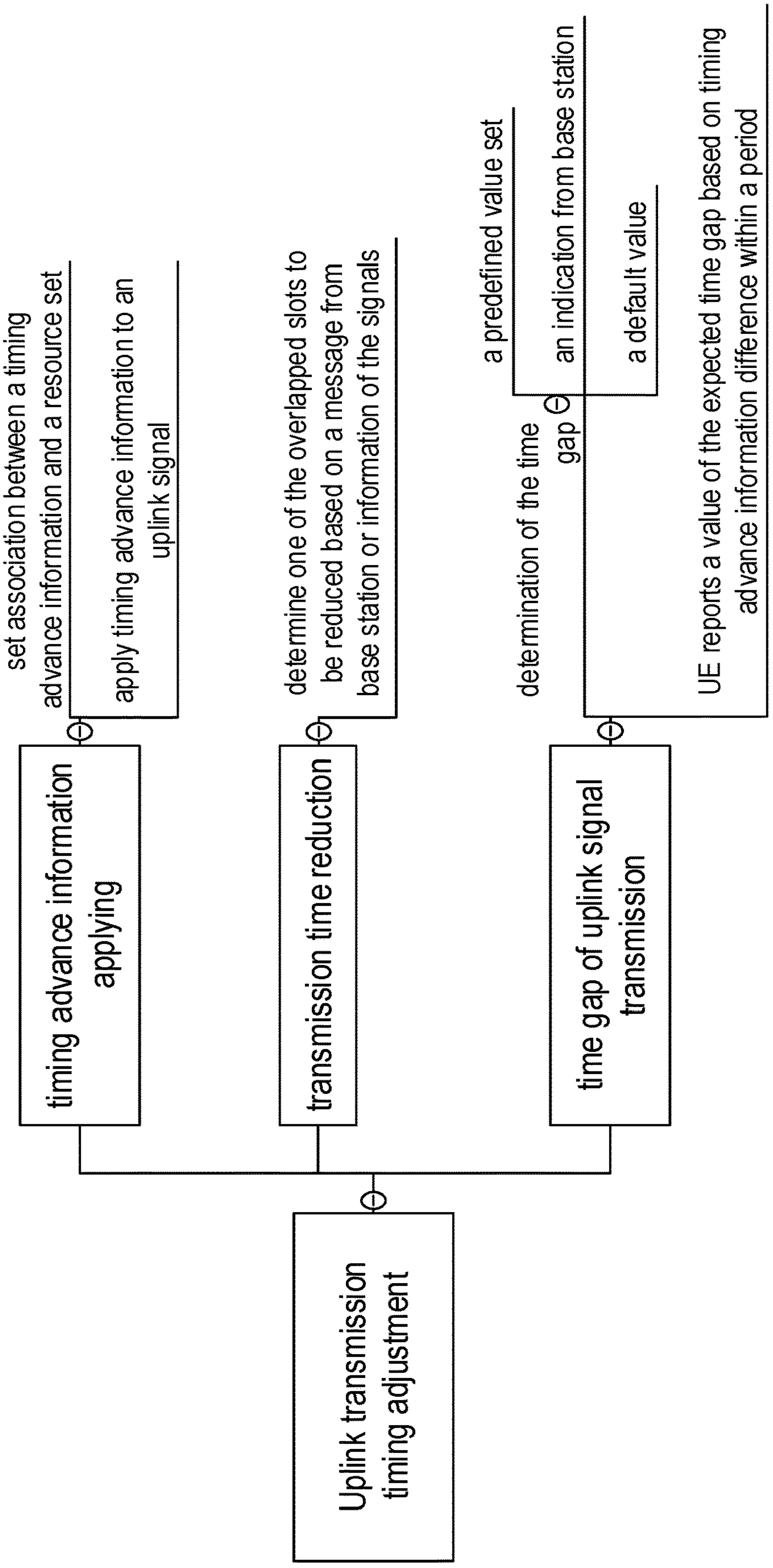
FIG. 3 shows an example diagram illustrating a framework for uplink transmission timing adjustment based on some implementations of the disclosed technology.

FIG. 3 shows an example diagram illustrating a framework for uplink transmission timing adjustment based on some implementations of the disclosed technology.

The following features are examples of some aspects of the various approaches to adjust uplink transmission time.

(1) Applying a TAC to adjust the transmission timing of an uplink transmission:

The UE receives a message configuring or indicating more than one timing advance information for a serving cell or a TAG. For example, the message may comprise first timing advance information associated with first transmission information and second timing advance associated with second transmission information. In some implementations, the timing advance information comprises at least one of a TAG index, a timing advance command of a TAG, a reference timing advance command of a TAG, a timing advance offset of a TAG or a timing advance offset of a transmission information. The reference timing advance command of a TAG indicates the value of TAC for a transmission information associated with the TAG, and the timing advance offset of a TAG indicates the offset value of TAC for another transmission information associated with the TAG. The timing advance offset of a transmission information is configured by RRC messages or determined based on a predefined value set. In some implementation, the message comprises at least one of MAC CE messages, DCI formats or RRC signaling.

The UE receives a message including more than one transmission resource information. The transmission resource information is associated with transmission information. In some implementations, the transmission resource information comprises at least one of a resource set, a group of resources, a resource index, the time and/or frequency domain position, a type of resource, a type of signal format, information of frequency hopping, a control resource set (CORESET), a CORESET pool, a configuration of a transmission or a TCI state.

The UE transmits a first uplink transmission associated with a first transmission resource information and a second uplink transmission associated with a second transmission resource information. In some implementations, the uplink transmissions are scheduled or configured to transmit by the base station.

The UE adjusts transmission timing of a first uplink transmission based on a first timing advance information and adjusts transmission timing of a second uplink transmission based on a second timing advance information.

More details can be discussed in relation to Embodiment 1.

(2) Adjacent uplink slots overlapping in time domain

Figure 4:
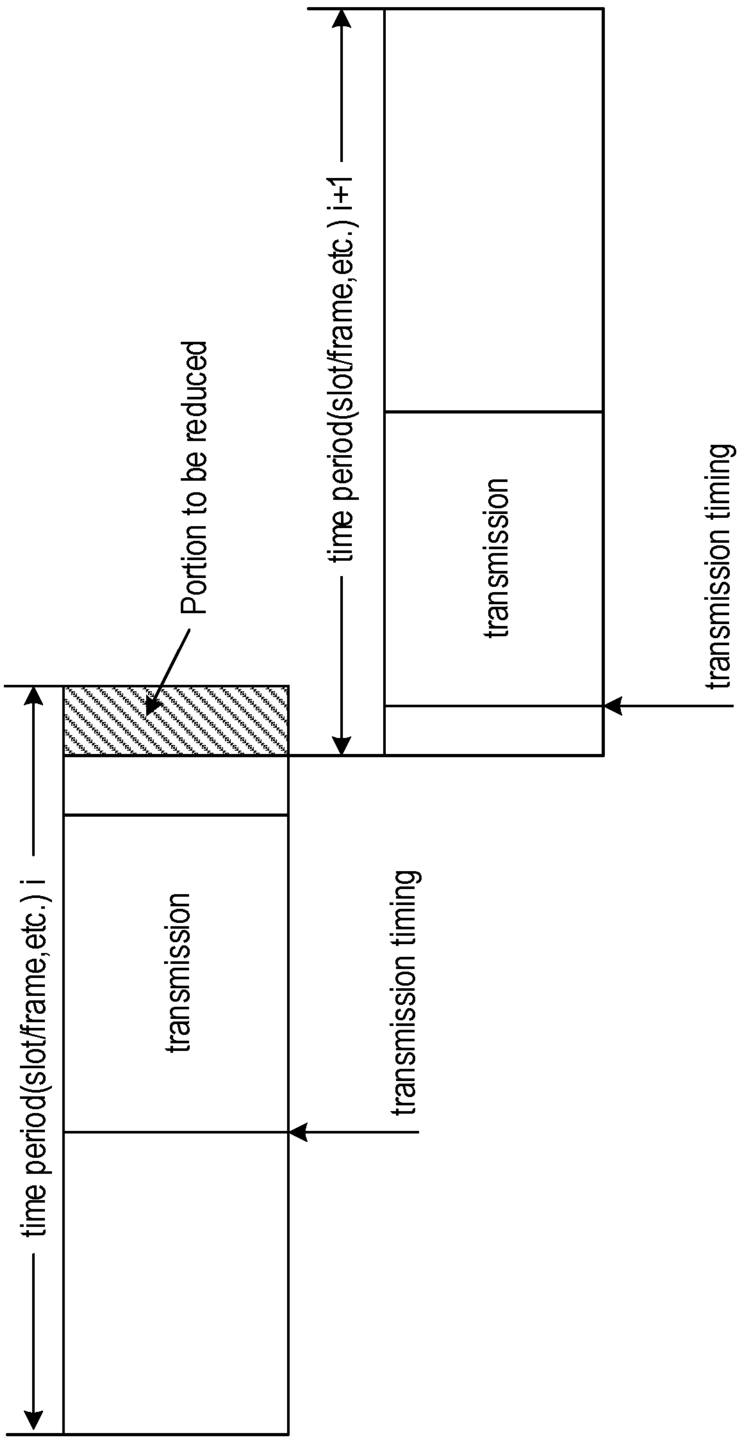
FIG. 4 shows example of diagrams of two adjacent slots in time domain based on some implementations of the disclosed technology.

The UE transmits a first set of uplink transmissions associated with a first transmission information in a first slot/sub-slot/frame/sub-frame and a second set of uplink transmissions associated with a second transmission information in a second slot/sub-slot/frame/sub-frame. The first slot and the second slot are adjacent in time-domain. The first transmission information and the second transmission information can be the same or different. The set of uplink transmissions can comprise one or more uplink transmissions. FIG. 4 shows example diagrams of two slots that are adjacent in time domains. The slots are the example only and the slot can be replaced with a sub-slot, a frame, or a sub-frame, or others. In the descriptions below, the left-top slot and the right-bottom slot are referred to as the first slot and the second slot, respectively.

The UE adjusts transmission timing of uplink transmissions in the first slot based on a first timing advance information and adjusts transmission timing of uplink transmissions in the second slot based on a second timing advance information. In some implementations, the first timing advance information includes first timing advance information to be applied to the first slot and the second timing advance information includes second timing advance information to be applied to the second slot. When the first timing advance information and the second timing advance information are different from each other, different timing advances are applied to the first slot and the second slot based on the first timing advance information and the second timing information. In this case, with the different timing advances applied to the first slot and the second slot, the first slot and the second slot has the overlapped portion in time domain as shown in FIG. 4. In the current stage, normally the UE cannot transmit the overlapped parts of two slots at the same time. Thus, the overlapping issue of the two adjacent slots need to be addressed. In some implementations of the disclosed technology, to address the overlapping issue, the UE determines to reduce the time period of the first slot or the time period of the second slot based on an information of uplink transmissions in the overlapped slots or a message from the base station. Referring back to FIG. 4, FIG. 4 shows the example when the UE determines to reduce the time period of the first slot. In the example of FIG. 4, the portion with the hatched line corresponds to the portion to be reduced and after the reduction, the first slot has the reduced duration as compared to one before the reduction. The transmission period before the reduction, which may be referred to the initial time period, is generally fixed for a specific configuration, e.g., SCS (subcarrier spacing), and through the reduction, the first slot has the reduced period by removing the hatched portion.

When the UE determines to reduce the time period of the first slot or the second slot based on the information of the uplink transmissions, the information of the uplink transmissions comprises at least one of a priority indication in the DCI format scheduling the uplink transmission, a type of the uplink transmission, a flag of whether carrying a specific UCI, or a priority of UCI type. When the UE determines to reduce the time period of the first slot or the second slot based on the message from the base station, the message from the base station comprises at least one of a transmission information, a type of uplink transmission, or a type of UCI. The information of the uplink transmissions can be obtained from a message from base station as well. When the UE determines to reduce the time period of the first slot or the second slot based on a predefined rule, the predefined rules comprises at least information on UCI types, a priority of types of the transmission associated with the first slot or the second slot, or a priority of the transmission associated with the first slot or the second slot.

The UE reports an information which comprises at least one of the index of a slot, the transmission information or a list of uplink transmissions.

More details can be discussed in relation to Embodiment 2.

(3) Avoiding overlapping of uplink transmissions

The UE receives a message configuring or indicating more than one timing advance information for a serving cell or a TAG.

The UE adjusts transmission timing of uplink transmissions in the first slot and transmission timing of uplink transmissions in the second slot. In some implementations, the UE determines the time gap based on a predetermined value set or a predetermined table. The predetermined value set or the predetermined table comprises a list of the number of OFDM symbols. In some implementations, the UE receives a time gap message including one of the number of OFDM symbols, an index of a predetermined value set or an index of an entry in the predetermined table. In some implementations, the UE determines not to transmit uplink transmissions associated with a second timing advance information in OFDM symbols that start from the end of the OFDM symbols of an uplink transmission or a slot which is adjusted transmission timing based on a first timing advance information and end based on the time gap message.

The UE receives a message from the base station including at least one of a reporting period or a reporting scheme. The reporting period refers to a duration that the UE is instructed to report a value related to timing advance information differences determined within the duration. In some implementations, the reporting scheme includes maximum reporting, minimum reporting, average value reporting or a value range of candidate timing advance information differences. For example, when the UE receives the message from the base station to indicate the maximum reporting, the UE reports the maximum value of the candidate timing advance information differences. When the UE receives the message from the base station to indicate the minimum reporting, the UE reports the minimum value of the candidate timing advance information differences. When the UE receives the message from the base station to indicate the average value reporting, the UE reports the average of the candidate timing advance information differences. When the UE receives the message from the base station to indicate the value range reporting, the UE reports the value range at least including the candidate timing advance information differences.

In some implementations, the UE reports information of time gap based on at least one of the reporting period, reporting scheme and timing advance information difference. The timing advance information difference is determined based on timing advance information associated with adjacent slots/frames. In some implementations, the UE receives a message that indicates or configures to enable or disable the reporting behavior. When disabled, the UE determines the time gap based on a predetermined value set or a predetermined table or a default rule as discussed above. When enabled, the UE reports the information of time gap based on the configured reporting period, reporting scheme and timing advance information difference.

More details can be found in relation to Embodiment 3.

Embodiment 1

Embodiment 1 is to adjust transmission timing of an uplink transmission associated with a transmission information based on one of timing advance information received by the UE.

In some embodiments, the UE receives multiple timing advance information associated with respective transmission information, wherein the timing advance information comprises at least one of a TAG index, a timing advance command of a TAG, a reference timing advance command of a TAG, a timing advance offset of a TAG, or a timing advance offset of a transmission information. The UE receives multiple transmission resource information, each of which comprises at least one of a resource set, a group of resources, a resource index, the time and/or frequency domain position, a type of resource, a control resource set (CORESET), a CORESET pool, a type of signal format, information of frequency hopping, a configuration of a transmission or a TCI state. The configuration of the transmission comprises at least one of a configuration of PUCCH, a configuration of PUSCH, a configuration of a SRS, a configuration of RACH or a configuration for uplink transmission without dynamic grant. The UE obtains the association between a transmission resource information and a transmission information based on the received information. For example, the association obtained by the UE indicates that a first transmission resource information named resource set A is associated with a first transmission information and a second transmission resource information named resource set B is associated with a second transmission information.

In some embodiments, the UE is indicated or configured to associate a first transmission information to X PUCCH resources in the configured resource group and associate a second transmission information to Y PUCCH resources in the group based on the configuration of PUCCH, wherein X and Y are indicated by the base station. The UE adjusts transmission timing of transmission of PUCCH within the X PUCCH resources based on a first timing advance information and adjusts transmission timing of transmission of PUCCH within the Y PUCCH resources based on a second timing advance information.

In some embodiments, the UE is configured with two PUCCH or SRS resource sets based on the configuration of PUCCH or SRS, each of which is associated with a transmission information. The UE adjusts transmission timing of transmission of PUCCH included in a first resource set based on a first timing advance information and adjust transmission timing of transmission of PUCCH included in a second resource set based on a second timing advance information.

In some embodiments, the UE adjusts transmission timing of a first PUSCH transmission associated with a SRS resource included in a first resource set based on a first timing advance information and adjusts transmission timing of a second PUSCH transmission associated with a SRS resource included in a second resource set based on a second timing advance information. The UE associates a PUSCH transmission to a SRS resource transmitted most recently before the DCI which schedules the PUSCH or associates a PUSCH transmission to a SRS resource according to the TCI state.

Figure 5:
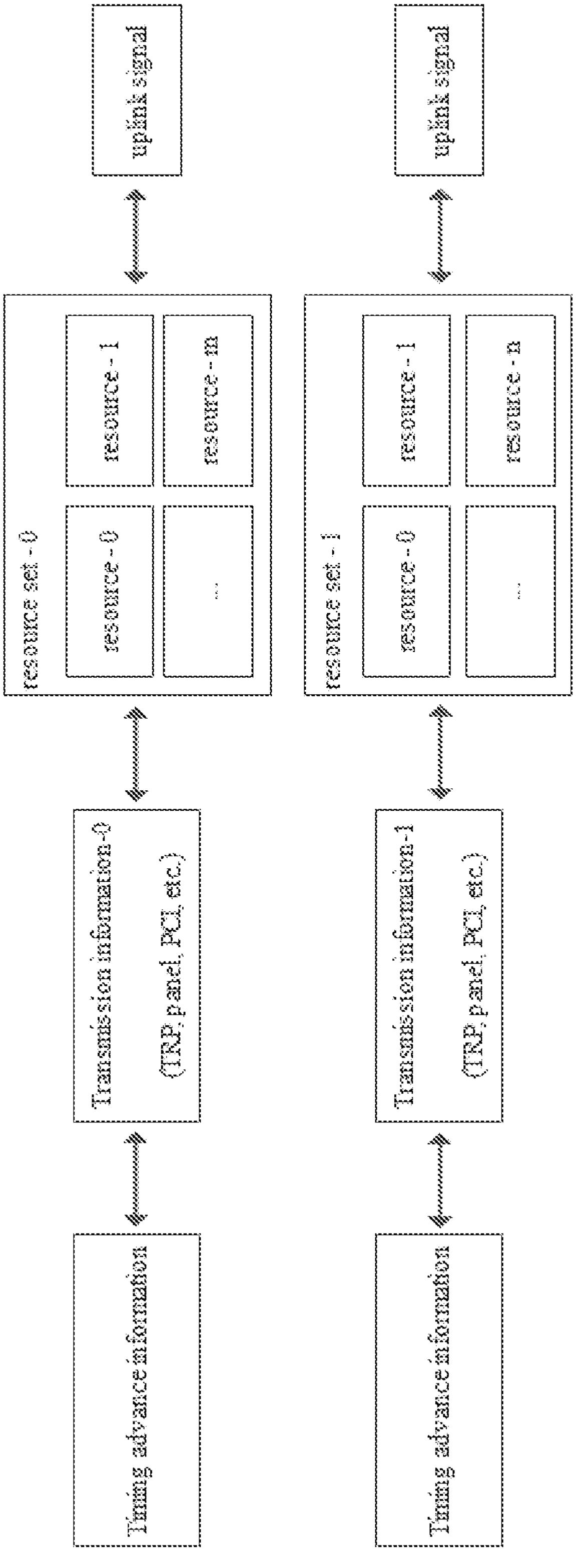
FIG. 5 shows an example of an association between uplink transmissions and timing advance information based on some implementations of the disclosed technology.

FIG. 5 shows an example of an association between uplink transmissions and timing advance information. As shown in FIG. 5, the UE can obtain the association between an uplink transmission and a timing advance information according to the configuration, and directly apply the timing advance information to an uplink transmission without a value of CORESETPoolIndex or TRP-index.

Embodiment 2

Embodiment 2 is to define UE behavior when two slots overlap due to different timing advance information applied to two slots. In some implementations, the UE determines to reduce a duration of one of the slots based on a message from the base station or a predefined rule. In some other implementations, the base station indicates UE to reduce the duration of one of the slots based on the message from the base station. In some implementations, the UE reports some information to the base station regarding which slot has a reduced duration or which uplink transmission is canceled.

In some embodiments, one or more OFDM symbols of two slots overlap due to applying different timing advance information, and one or more uplink transmissions are transmitted within the overlapped OFDM symbols.

In some embodiments, the two slots satisfy at least one of the following:

- The first slot is with index i, and the second slot is with index i+1.
- The first slot starts before the beginning of the timing of the second slot.
- The two slots are adjacent in time domain.
- The first slot ends not earlier than the beginning of the timing of the second slot.

In some embodiments, the UE receives a message including at least one of transmission information, a type of uplink transmission, or a type of UCI. The UE reduces the duration of the slot in which the uplink transmission associated with the message is transmitted or not transmitted. For example, the base station indicates the index of TRP-1 to the UE, and the UE will reduce the duration of the uplink slot in which the UE transmits uplink transmissions associated with TRP-1. In another example, the base station indicates the UCI type to be HARQ-ACK, and the UE will reduce the duration of the uplink slot in which the UE transmits uplink transmissions not carrying HARQ-ACK information.

In some embodiments, the UE obtains information of uplink transmissions which are transmitted in the overlapped OFDM symbols of the adjacent slots. The information comprises at least one of a priority indication in the DCI format scheduling the uplink transmission, a type of the uplink transmission, a flag of whether carrying a specific UCI, or a priority of UCI type. For example, the UE will reduce a duration of the slot in which a PUSCH is scheduled by a DCI with lower priority indication. In another example, the UE will reduce a duration of the slot in which an uplink transmission carrying CSI is transmitted when an uplink transmission carrying HARQ-ACK is transmitted in the another slot. In some implementations, the UE determines the reduction based on a predefined rule, wherein the predefined rule comprises at least one of the following:

- Reduce the duration of the slot in which an uplink transmission is scheduled by a DCI format with priority indication 0 rather than the slot in which an uplink transmission is scheduled by a DCI format with priority indication 1.
- Reduce the duration of the slot in which an uplink transmission with lower priority is transmitted rather than the slot in which an uplink transmission with higher priority is transmitted. An example priority based on UCI types can be HARQ-ACK information >SR>LRR>CSI. Another example priority based on types of uplink transmissions can be PRACH>PUCCH>PUSCH>SRS.
- Reduce the duration of the slot in which an uplink transmission not carrying a specific UCI type rather than the slot in which an uplink transmission carrying the specific UCI type. The specific UCI type can be HARQ-ACK information by default.

In some embodiments, the UE reports an information to the base station, and the information comprises at least one of the index of a slot, the transmission information or a list of uplink transmissions. The information is associated with the slot whose duration is reduced by the UE or the uplink transmissions which are canceled due to the duration reduction. For example, the UE determines to reduce the duration of the slot with index n and reports to the base station the index of the slot, i.e., n. In another example, the UE determines to reduce the duration of a slot resulting in a plurality of uplink transmissions are canceled, and UE reports to base station the list of these canceled uplink transmissions.

Figure 6:
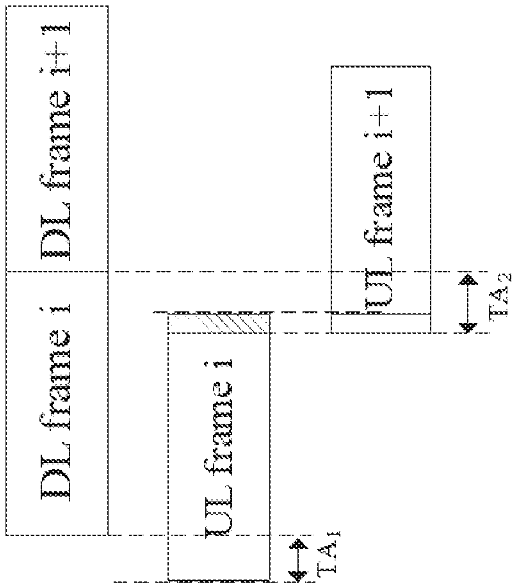
FIG. 6 shows an example of a uplink transmission overlapping due to different timing advance based on some implementations of the disclosed technology.

FIG. 6 shows an example of an uplink transmission overlapping due to different timing advance. As shown in FIG. 6, the UE adjusts transmission timing of uplink frame i based on timing advance $TA_1$ and adjusts transmission timing of uplink frame i+1 based on timing advance $TA_2$, wherein $TA_1$ and $TA_2$ are determined based on timing advance information associated with respective transmission information. In this example, the UE receives a message to reduce transmission duration of an uplink slot associated with $TA_1$ and the transmission of overlapped part (see the hatched pattern in FIG. 6) of uplink frame i is canceled.

Embodiment 3

Embodiment 3 is to introduce a time gap to restrict uplink transmission to avoid an overlapping of the uplink transmissions when different timing advance information is applied to adjust the transmission timing of the uplink transmissions in two slots, wherein the two slots satisfy the conditions discussed in relation to Embodiment 2. The time gap comprises at least one of a number of OFDM symbols or a duration of time. Within the time gap staring from the end of the last OFDM symbol of the uplink transmissions associated with a first timing advance information, the UE does not transmit uplink transmissions associated with a second timing advance information.

In some embodiments, the UE determines the time gap based on a predetermined value set, a predetermined table or default rules.

In some implementations, a set of values is predetermined based on the following equation:

$$X = \text{ceil}\left[(N_{TAoffset,diff} + N_{TAC,diff})^* T_c / L_{OFDM}\right] \quad \text{Equation (1)}$$

In Equation (1), X is the time gap with the unit of OFDM symbol, $N_{TAoffset,diff}$ is the difference between values of timing advance offset configured by RRC signaling or predefined for a serving cell for two transmission information, $N_{TAC,diff}$ is the difference between timing advance values determined based on timing advance information for two transmission information, $T_c$ is the basic time unit in NR system, $L_{OFDM}$ is the length of a OFDM symbol.

In some embodiments, each value of determined X will be added to a constant value.

A plurality of tables are predetermined. Table 1 shows the example of the predetermined table, and the values are determined based on the equation above.

TABLE 1

A predetermined table for the time gap

| SCS/kHz | The number of OFDM symbols | Timing advance difference range/microsecond |
|---|---|---|
| 15 | 1 | 4.69~52 |
| 30 | 1 | 2.34~33.33 |
| 30 | 2 | 33.33~36 |
| 60 | 1 | 1.17~16.67 |
| 60 | 2 | 16.67~28 |

Each row of the table above can be regarded as an entry of the predetermined table. In some embodiments, each of the entry has an corresponding index.

In some embodiments, X is the time gap with the unit of microsecond, and X is determined based on the following equation:

$$X = (N_{TAoffset,diff} + N_{TAC,diff}) * T_c + C, \quad \text{Equation (2)}$$

wherein $C$ is a constant value.

As discussed in Equation (1), in Equation (2), $N_{TAoffset,diff}$ is the difference between values of timing advance offset configured by RRC signaling or predetermined for a serving cell for two transmission information, $N_{TAC,diff}$ is the difference between timing advance values determined based on timing advance information for two transmission information, and $T_c$ is the basic time unit in NR system.

The default rule is specified based on the maximum of the overlapped OFDM symbols for a specific case. For example, when the maximum difference value between timing advance applied to different transmissions or slots is 50 μs, and the time gap is determined to be 50 μs accordingly. For another example, when the maximum difference value between timing advance applied to different transmissions or slots is within the range from the length of Y OFDM symbols to the length of Y+1 OFDM symbols, the time gap is determined to be the length of Y+1 OFDM symbols accordingly.

In some embodiments, the UE receives a message comprising one of a number of OFDM symbols, an index of a predetermined value set or an index of an entry in a predetermined table and determines the time gap based on the message. For example, the UE receives a message indicating four OFDM symbols, and the UE determines the time gap to be four OFDM symbols. In another example, the UE receives a message indicating an index of an entry in a predetermined table, and the UE determines the time gap to be the number of OFDM symbols associated with the index.

In embodiments below, timing advance information difference is determined based on timing advance information associated with the first time period and the second period or the first and second transmissions in the first time period and the second time period. In an example, timing advance information difference is determined based on $N_{TAoffset,diff}$ and $N_{TAC,diff}$. A timing advance information difference is a candidate timing advance information difference or is valid only if the adjacent time periods associated with timing advance information difference are overlapped in time domain.

In some embodiments, the UE reports a value or a value range based on timing advance information difference within a period, wherein the value or value range is determined as the average, maximum, or median of all the candidate/valid timing advance information differences.

In some embodiments, the UE receives a message indicating the reporting period and/or the scheme of determination of the value/value range.

In some embodiments, the UE receives a message to enable or disable the reporting procedures. When the reporting procedures are disabled, the UE determines the time gap based on a default value, a predetermined table, or a set of predetermined values.

Figure 7:
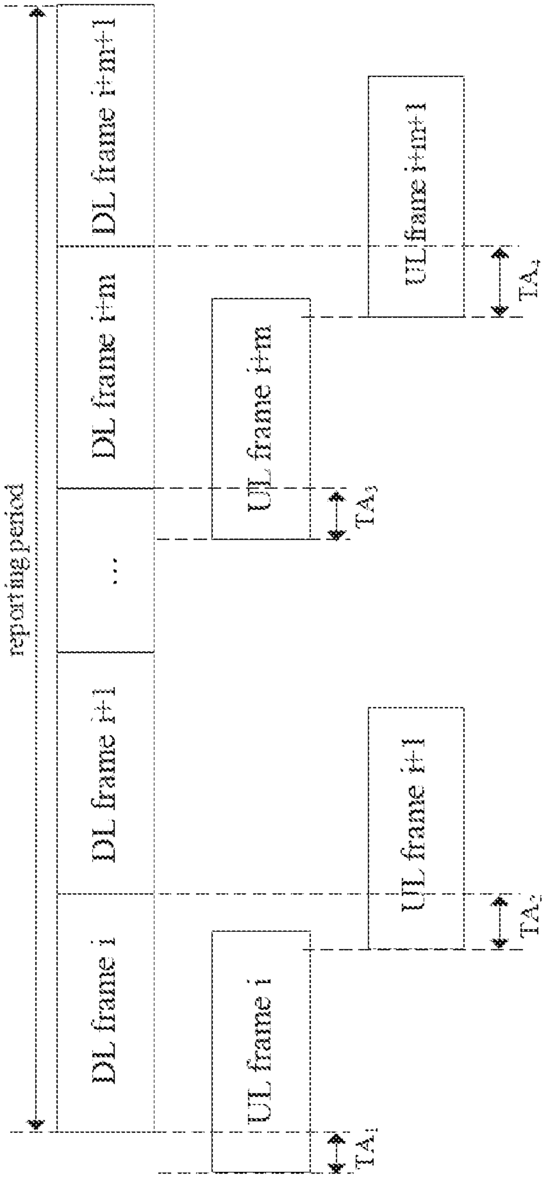
FIG. 7 shows an example of UE reporting for time gap determination based on some implementations of the disclosed technology based on some implementations of the disclosed technology.

FIG. 7 shows an example of UE reporting for time gap determination. The example as shown in FIG. 7 corresponds to the case when the UE receives the message to enable the reporting procedure. In FIG. 7, it is assumed that within the reporting period, candidate timing advance information differences are $TA_2$-$TA_1$ and $TA_4$-$TA_3$, and the UE is indicated to report the maximum timing advance information difference. Thus, the UE will report max($TA_2$-$TA_1$, $TA_4$-$TA_3$) and expects base station not to schedule uplink transmissions in the symbols within the reported time gap.

Figure 8:
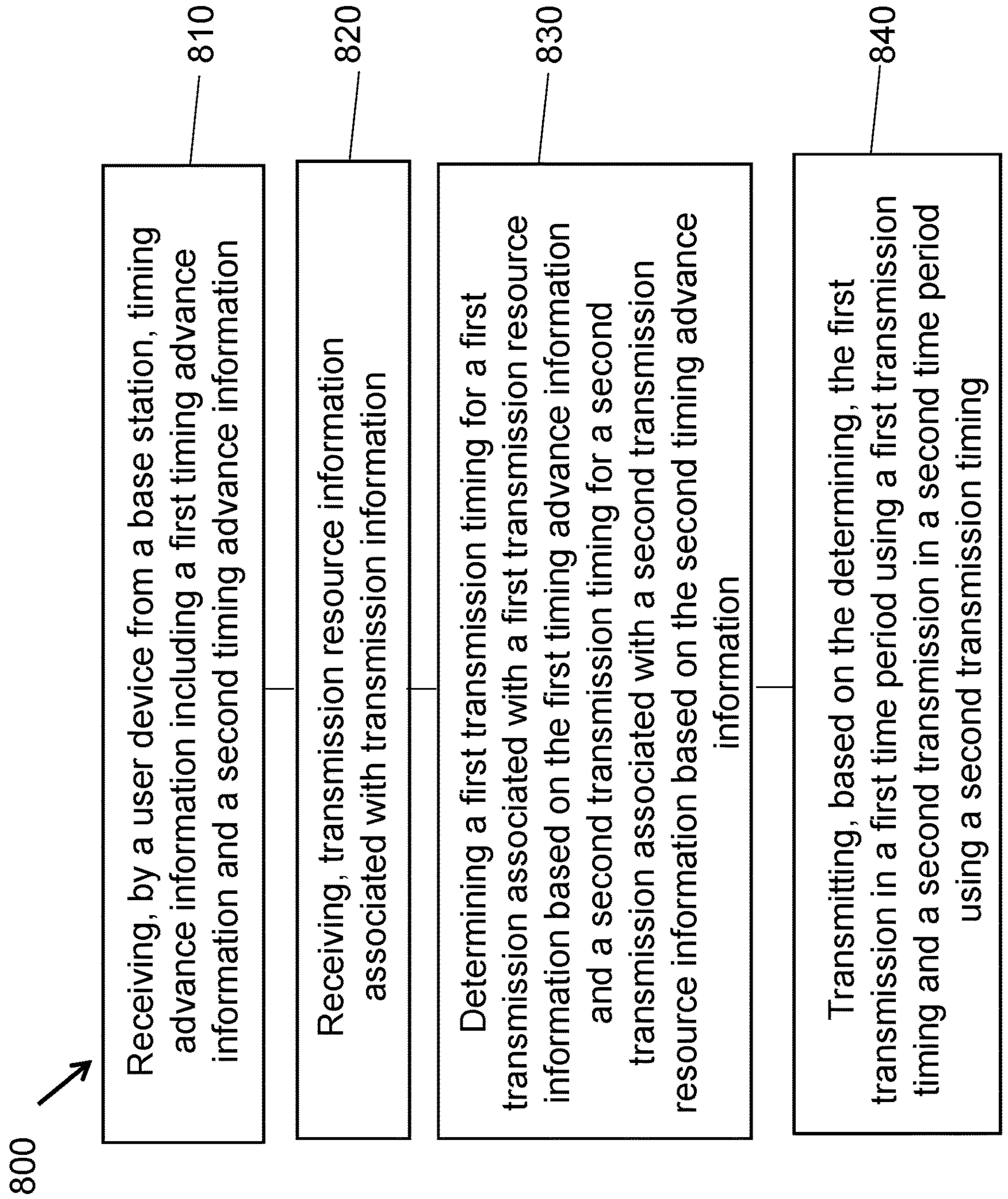
FIGS. 8 and 9 illustrate flowcharts showing example methods of wireless communication based on some implementations of the disclosed technology.

FIG. 8 illustrates a flowchart showing an example method of wireless communication based on some implementations of the disclosed technology. The method 800 includes, at operation 810, receiving, by a user device from a base station, timing advance information including a first timing advance information and a second timing advance information. The method 800 further includes, at operation 820, receiving, transmission resource information associated with transmission information. The method 800 further includes, at operation 830, determining a first transmission timing for a first transmission associated with a first transmission resource information based on the first timing advance information and a second transmission timing for a second transmission associated with a second transmission resource information based on the second timing advance information. The method 800 further includes, at operation 840, transmitting, based on the determining, the first transmission in a first time period using a first transmission timing and a second transmission in a second time period using a second transmission timing.

In some implementations, the first time period and the second time period are adjacent in time domain, or wherein the first time period starts earlier than the second time period. In some implementations, the method 800 further comprises, prior to the transmitting, determining, based on a message or a predefined rule, to reduce a duration of the first time period or a duration of the second time period. In some implementations, the message comprises at least one of the transmission information, a type of the first transmission or the second transmission, a type of a uplink control information (UCI), a priority indication in a downlink control information format or a flag of whether carrying a specific uplink control information (UCI). In some implementations, the predefined rule comprises at least one of a priority of UCI types, a priority of types of the transmission or a priority of the transmission.

In some implementations, the method 800 further comprises: determining a time gap based on at least one of a predetermined value set, a predetermined table, a predetermined default rule, or a message including at least one of a number of symbols, an index of the predetermined value set or an index of an entry in the predetermined table; and determining not to transmit the second transmission associated with the second timing advance information in the time gap. In some implementations, the predetermined value set or the predetermined table is determined based on candidate timing advance information differences associated with the first transmission and the second transmission. In some implementations, the method 800 further comprises receiving, from the base station, a message including at least one of a reporting period or a reporting scheme, the reporting scheme comprising reporting at least one of a maximum value, a minimum value, an average value, or a value range of candidate timing advance information differences in a reporting period. In some implementations, the method 800 further comprises transmitting, by the user device, a reporting information determined based on the message, the reporting information including the maximum value, minimum value, an average value, or a value range of candidate timing advance information differences. In some implementations, a timing advance information difference is determined based on timing advance information associated with the first time period and the second period or the first and second transmissions in the first time period and the second time period. In some implementations, a timing advance information difference is a candidate timing advance information difference if the first time period and the second time period are overlapped.

Figure 9:
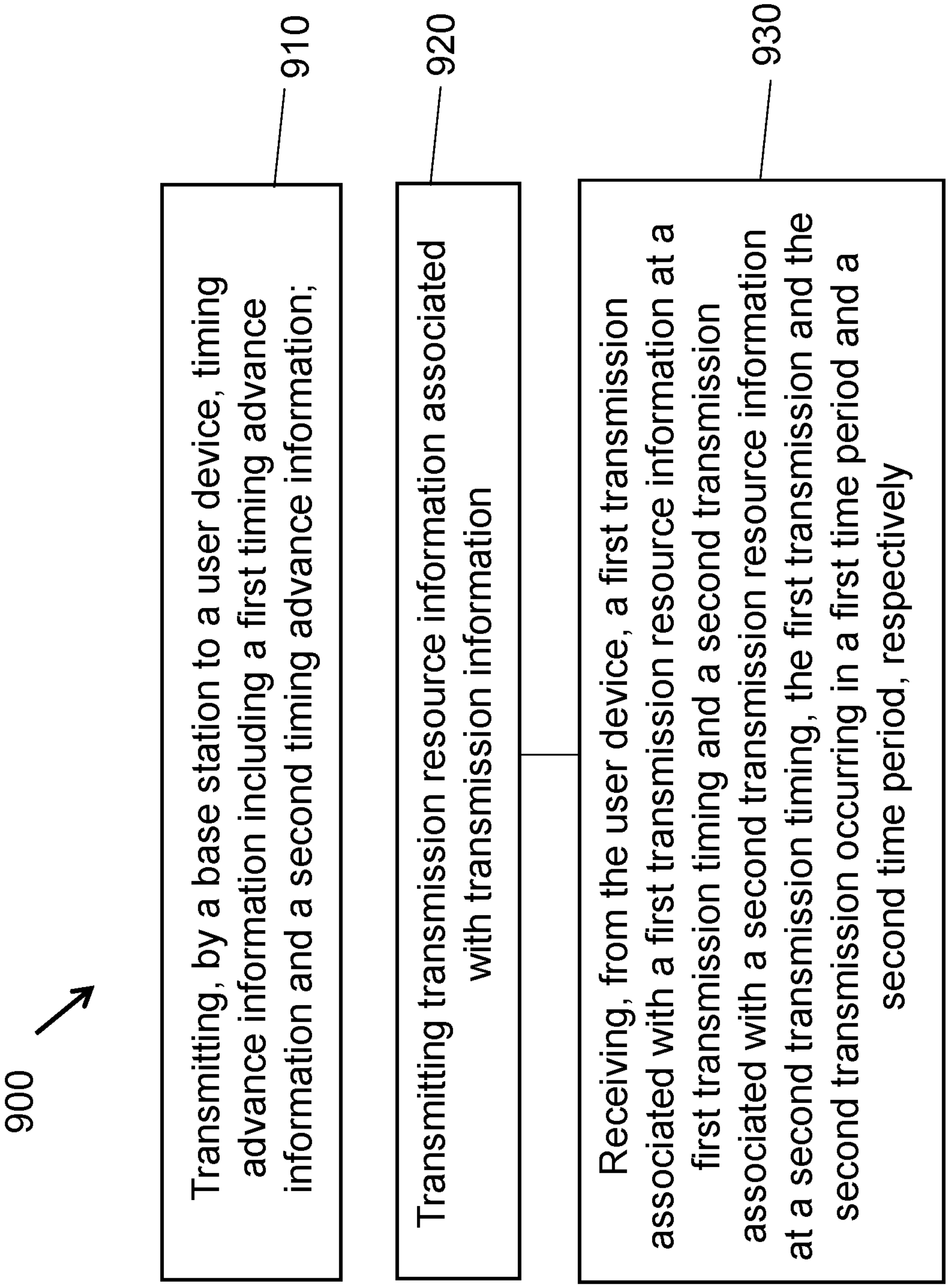

FIG. 9 illustrates a flowchart showing an example method of wireless communication based on some implementations of the disclosed technology. The method 900 includes, at operation 910, transmitting, by a base station to a user device, timing advance information including a first timing advance information and a second timing advance information. The method 900 further includes, at operation 920, transmitting transmission resource information associated with transmission information. The method 900 further includes, at operation 930, receiving, from the user device, a first transmission associated with a first transmission resource information at a first transmission timing and a second transmission associated with a second transmission resource information at a second transmission timing, the first transmission and the second transmission occurring in a first time period and a second time period, respectively.

In some implementations, the first time period and the second time period are adjacent in time domain, or the first time period starts earlier than the second time period, and the method 900 further comprises determining to reduce the first time period or the second time period based on a message from the base station or a predefined rule. In some implementations, the first time period or the second time period is reduced based on a message from the base station or a predefined rule. In some implementations, the message from the base station comprises at least one of the transmission information, a type of the first transmission or the second transmission, a type of a uplink control information (UCI), a priority indication in a downlink control information format, a flag of whether carrying a specific uplink control information (UCI). In some implementations, the predefined rule comprises at least one of a priority of UCI types, a priority of types of the first transmission or the second transmission, or a priority of the first transmission or the second transmission.

In some implementations, the method 900 further comprises sending a time gap message including at least one of a number of symbols or an index of a predetermined value set or an index of an entry in the predetermined table. In some implementations, the predetermined value set or the predetermined table is determined based on timing advance information differences associated with the first transmission and the second transmission. In some implementations, the method 900 further comprises sending a message including at least one of a reporting period or a reporting scheme, the reporting scheme comprising reporting at least one of a maximum value, a minimum value, an average value, or a value range of candidate timing advance information differences in a reporting period. In some implementations, the method 900 further comprises receiving, from the user device, a reporting information determined based on the message, the reporting information including the maximum value, minimum value, an average value, or a value range of candidate timing advance information differences.

In the implementations as discussed with reference to FIGS. 8 and 9, each of the first transmission and the second transmission comprises at least one of a transmission occasion of an uplink signal comprising PUCCH, PUSCH, SRS or PRACH, or a repetition of the uplink signal and wherein the transmission information comprises at least one of information grouping one or more reference signals, a reference signal resource set, a PUCCH resource set, panel related information, a sub-array, an antenna group, an antenna port group, a group of antenna ports, a beam group, a beam state, a candidate cell, a candidate cell group, a physical cell index (PCI), a time alignment group (TAG), TRP related information, a CORESET pool index, a set of power control parameters, an index of TCI state in a TCI state codepoint, a UE capability value, or a UE capability set. In the implementations, the timing advance information comprises at least one of comprises at least one of a TAG index, a timing advance command of a TAG, a reference timing advance command of a TAG, a timing advance offset of a TAG or a timing advance offset of a transmission information. In the implementations, a transmission resource information comprises at least one of a resource set, a group of resources, a resource index, the time and/or frequency domain position, a type of resource, a type of signal format, information of frequency hopping, a control resource set (CORESET), a CORESET pool, or a configuration of a transmission or a TCI state. In the implementations, the first transmission or the second transmission are transmitted or received in at least one of a slot, a sub-slot, a frame or a sub-frame.

Figure 10:
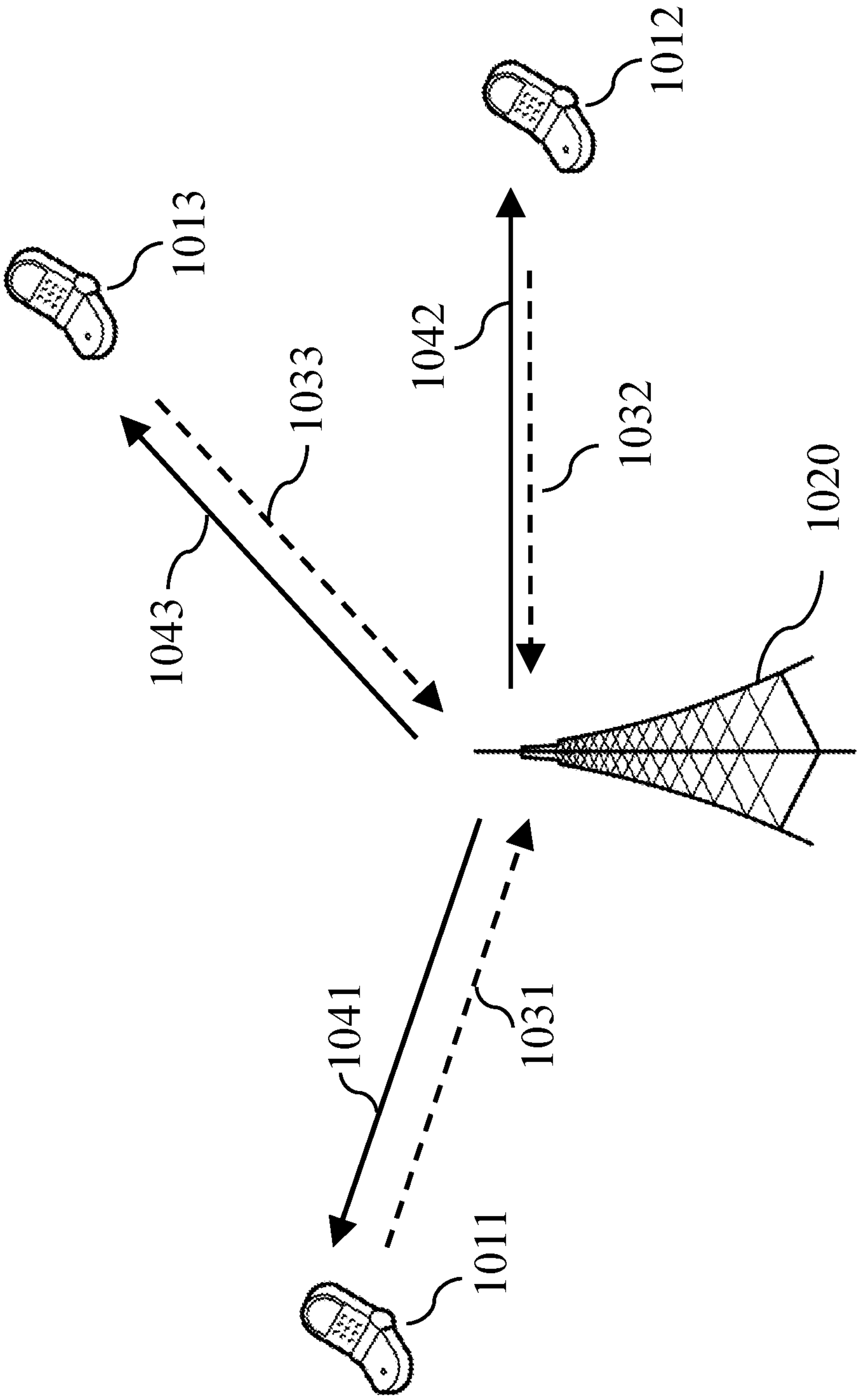
FIG. 10 shows an example of wireless communication including a base station (BS) and user equipment (UE) based on some implementations of the disclosed technology.

The implementations as discussed above will apply to a wireless communication. FIG. 10 shows an example of a wireless communication system (e.g., a 5G or NR cellular network) that includes a base station 1720 and one or more user equipment (UE) 1011, 1012 and 1013. In some embodiments, the UEs access the BS (e.g., the network) using implementations of the disclosed technology 1031, 1032, 1033, which then enables subsequent communication 1042, 1042, 1043) from the BS to the UEs. The UE may be, for example, a smartphone, a tablet, a mobile computer, a machine to machine (M2M) device, an Internet of Things (IoT) device, and so on.

Figure 11:
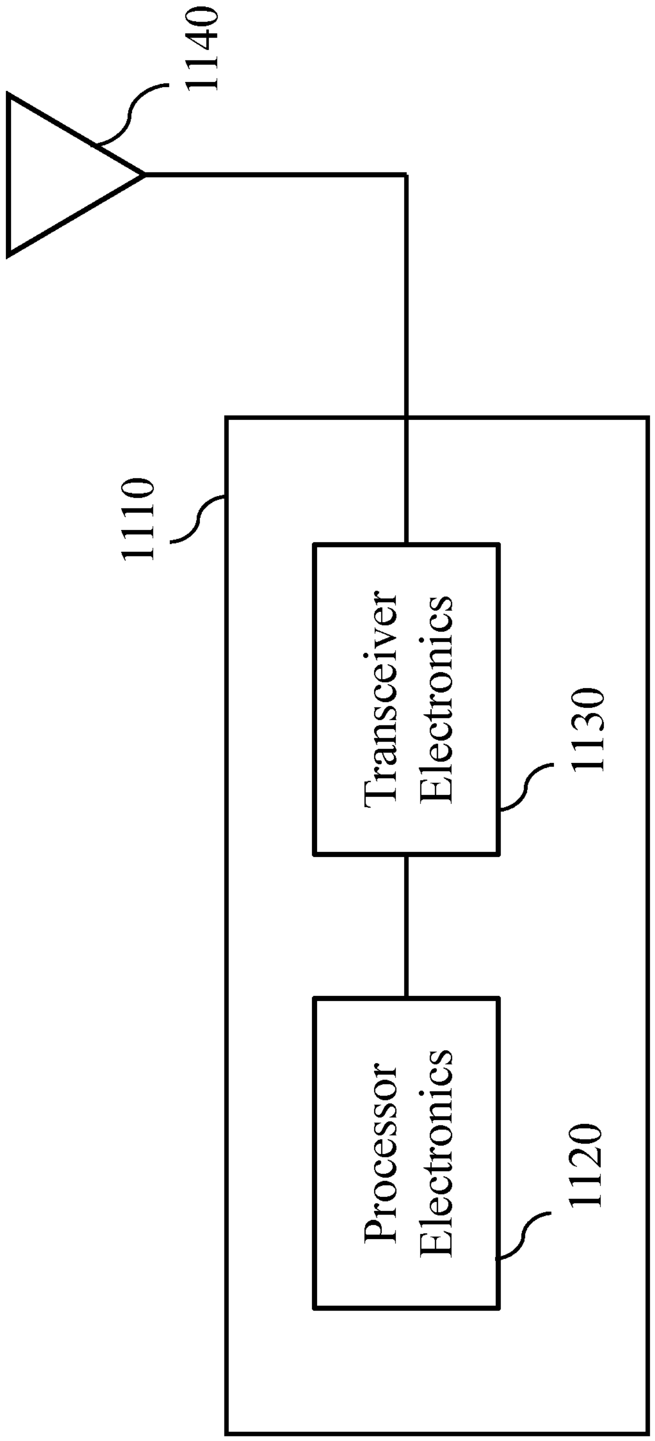
FIG. 11 shows an example of a block diagram of a portion of an apparatus based on some implementations of the disclosed technology.

FIG. 11 shows an example of a block diagram representation of a portion of an apparatus. An apparatus 1110 such as a base station or a user device which may be any wireless device (or UE) can include processor electronics 1120 such as a microprocessor that implements one or more of the techniques presented in this document. The apparatus 1110 can include transceiver electronics 1130 to send and/or receive wireless signals over one or more communication interfaces such as antenna 1840. The apparatus 1110 can include other communication interfaces for transmitting and receiving data. The apparatus 1110 can include one or more memories (not explicitly shown) configured to store information such as data and/or instructions. In some implementations, the processor electronics 1120 can include at least a portion of transceiver electronics 1130. In some embodiments, at least some of the disclosed techniques, modules or functions are implemented using the apparatus 1110.

It is intended that the specification, together with the drawings, be considered exemplary only, where exemplary means an example and, unless otherwise stated, does not imply an ideal or a preferred embodiment. As used herein, the use of "or" is intended to include "and/or", unless the context clearly indicates otherwise.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations. enhancements and variations can be made based on what is described and illustrated in this disclosure.

What is claimed is:

1. A method of wireless communication, comprising:

receiving, by a user device from a base station, timing advance information including a first timing advance information and a second timing advance information;

receiving, transmission resource information associated with transmission information;

determining a first transmission timing for a first transmission associated with a first transmission resource information based on the first timing advance information and a second transmission timing for a second transmission associated with a second transmission resource information based on the second timing advance information;

receiving, by the user device, a message to enable or disable a reporting behavior for reporting timing advance information differences;

in response to the reporting behavior being enabled, transmitting, by the user device, reporting information including a value or a value range based on candidate timing advance information differences within a reporting period;

in response to the reporting behavior being disabled, determining, by the user device, a time gap based on at least one of a predetermined value set, a predetermined table, or a default rule; and transmitting, based on the determining, the first transmission in a first time period using the first transmission timing and a second transmission in a second time period using the second transmission timing, and wherein the first time period and the second time period are adjacent in time domain, or wherein the first time period starts earlier than the second time period.

2. The method of claim 1, further comprising, prior to the transmitting, determining, based on a message or a predefined rule, to reduce a duration of the first time period or a duration of the second time period.

3. The method of claim 2, wherein the message comprises at least one of the transmission information, a type of the first transmission or the second transmission, a type of a uplink control information (UCI), a priority indication in a downlink control information format or a flag of whether carrying a specific uplink control information (UCI), or wherein the predefined rule comprises at least one of a priority of UCI types, a priority of types of the first transmission or the second transmission, or a priority of the first transmission or the second transmission.

4. The method of claim 1, further comprising:

determining not to transmit the second transmission associated with the second timing advance information in the time gap.

5. The method of claim 1, wherein the predetermined value set or the predetermined table is determined based on candidate timing advance information differences associated with the first transmission and the second transmission, and wherein a timing advance information difference is determined based on timing advance information associated with the first time period and the second time period or the first and second transmissions in the first time period and the second time period, or wherein a timing advance information difference is a candidate timing advance information difference if the first time period and the second time period are overlapped.

6. The method of claim 1, further comprising:

receiving, from the base station, a message including at least one of a reporting period or a reporting scheme, the reporting scheme comprising reporting at least one of a maximum value, a minimum value, an average value, or a value range of candidate timing advance information differences in a reporting period, and transmitting, by the user device, a reporting information determined based on the message, the reporting information including the maximum value, minimum value, an average value, or a value range of candidate timing advance information differences.

7. The method of claim 1, wherein each of the first transmission and the second transmission comprises at least one of a transmission occasion of an uplink signal comprising PUCCH, PUSCH, SRS or PRACH, or a repetition of the uplink signal and wherein the transmission information comprises at least one of information grouping one or more reference signals, a reference signal resource set, a PUCCH resource set, panel related information, a sub-array, an antenna group, an antenna port group, a group of antenna ports, a beam group, a beam state, a candidate cell, a candidate cell group, a physical cell index (PCI), a time alignment group (TAG), TRP related information, a CORESET pool index, a set of power control parameters, an index of TCI state in a TCI state codepoint, a UE capability value, or a UE capability set, and wherein at least one of the first transmission or the second transmission is transmitted or received in at least one of a slot, a sub-slot, a frame or a sub-frame.

8. The method of claim 1, wherein the timing advance information comprises at least one of comprises at least one of a TAG index, a timing advance command of a TAG, a reference timing advance command of a TAG, a timing advance offset of a TAG or a timing advance offset of a transmission information, and wherein a transmission resource information comprises at least one of a resource set, a group of resources, a resource index, time and/or frequency domain position, a type of resource, a type of signal format, information of frequency hopping, a control resource set (CORESET), a CORESET pool, or a configuration of a transmission or a TCI state.

9. A method of wireless communication, comprising:

transmitting, by a base station to a user device, timing advance information including a first timing advance information and a second timing advance information;

transmitting transmission resource information associated with transmission information;

transmitting, by the base station, a message to enable or disable a reporting behavior for reporting timing advance information differences;

in response to the reporting behavior being enabled, receiving, from the user device, reporting information including a value or a value range based on candidate timing advance information differences within a reporting period; and receiving, from the user device, a first transmission associated with a first transmission resource information at a first transmission timing and a second transmission associated with a second transmission resource information at a second transmission timing, the first transmission and the second transmission occurring in a first time period and a second time period, respectively.

10. The method of claim 9, wherein the first time period and the second time period are adjacent in time domain, or the first time period starts earlier than the second time period, and wherein the first time period or the second time period is reduced based on a message from the base station or a predefined rule.

11. The method of claim 10, wherein the message from the base station comprises at least one of the transmission information, a type of the first transmission or the second transmission, a type of a uplink control information (UCI), a priority indication in a downlink control information format, a flag of whether carrying a specific uplink control information (UCI), or wherein the predefined rule comprises at least one of a priority of UCI types, a priority of types of the first transmission or the second transmission, or a priority of the first transmission or the second transmission.

12. The method of claim 9, further comprising sending a time gap message including at least one of a number of symbols or an index of a predetermined value set or an index of an entry in a predetermined table, and wherein the predetermined value set or the predetermined table is determined based on timing advance information differences associated with the first transmission and the second transmission.

13. The method of claim 9, further comprising:

sending a message including at least one of a reporting period or a reporting scheme, the reporting scheme comprising reporting at least one of a maximum value, a minimum value, an average value, or a value range of candidate timing advance information differences in a reporting period, and receiving, from the user device, a reporting information determined based on the message, the reporting information including the maximum value, minimum value, an average value, or a value range of candidate timing advance information differences.

14. A communication apparatus comprising processor electronics configured to implement a method comprising:

receiving, by a user device from a base station, timing advance information including a first timing advance information and a second timing advance information;

receiving, transmission resource information associated with transmission information;

determining a first transmission timing for a first transmission associated with a first transmission resource information based on the first timing advance information and a second transmission timing for a second transmission associated with a second transmission resource information based on the second timing advance information;

receiving, by the user device, a message to enable or disable a reporting behavior for reporting timing advance information differences;

in response to the reporting behavior being enabled, transmitting, by the user device, reporting information including a value or a value range based on candidate timing advance information differences within a reporting period;

in response to the reporting behavior being disabled, determining, by the user device, a time gap based on at least one of a predetermined value set, a predetermined table, or a default rule; and transmitting, based on the determining, the first transmission in a first time period using the first transmission timing and a second transmission in a second time period using the second transmission timing, and wherein the first time period and the second time period are adjacent in time domain, or wherein the first time period starts earlier than the second time period.

15. The communication apparatus of claim 14, wherein the method further comprises, prior to the transmitting, determining, based on a message or a predefined rule, to reduce a duration of the first time period or a duration of the second time period.

16. The communication apparatus of claim 14, wherein the method further comprises:

determining not to transmit the second transmission associated with the second timing advance information in the time gap.

17. The communication apparatus of claim 14, wherein the method further comprises:

receiving, from the base station, a message including at least one of a reporting period or a reporting scheme, the reporting scheme comprising reporting at least one of a maximum value, a minimum value, an average value, or a value range of candidate timing advance information differences in a reporting period, and transmitting, by the user device, a reporting information determined based on the message, the reporting information including the maximum value, minimum value, an average value, or a value range of candidate timing advance information differences.

18. A communication apparatus comprising processor electronics configured to implement a method comprising:

transmitting, by a base station to a user device, timing advance information including a first timing advance information and a second timing advance information;

transmitting transmission resource information associated with transmission information; and transmitting, by the base station, a message to enable or disable a reporting behavior for reporting timing advance information differences;

in response to the reporting behavior being enabled, receiving, from the user device, reporting information including a value or a value range based on candidate timing advance information differences within a reporting period; and receiving, from the user device, a first transmission associated with a first transmission resource information at a first transmission timing and a second transmission associated with a second transmission resource information at a second transmission timing, the first transmission and the second transmission occurring in a first time period and a second time period, respectively.

19. The communication apparatus of claim 14, wherein the first time period and the second time period are adjacent in time domain, or the first time period starts earlier than the second time period, and wherein the first time period or the second time period is reduced based on a message from the base station or a predefined rule.

20. The communication apparatus of claim 14, wherein the method further comprises at least one of:

sending a time gap message including at least one of a number of symbols or an index of a predetermined value set or an index of an entry in a predetermined table, sending a message including at least one of a reporting period or a reporting scheme, the reporting scheme comprising reporting at least one of a maximum value, a minimum value, an average value, or a value range of candidate timing advance information differences in a reporting period, or receiving, from the user device, a reporting information determined based on the message, the reporting information including the maximum value, minimum value, an average value, or a value range of candidate timing advance information differences.

* * * * *